2,538,928

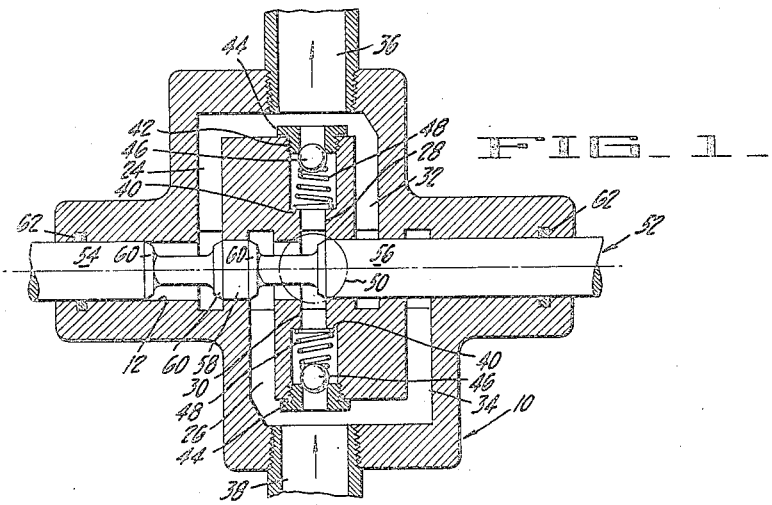
FIG_1_
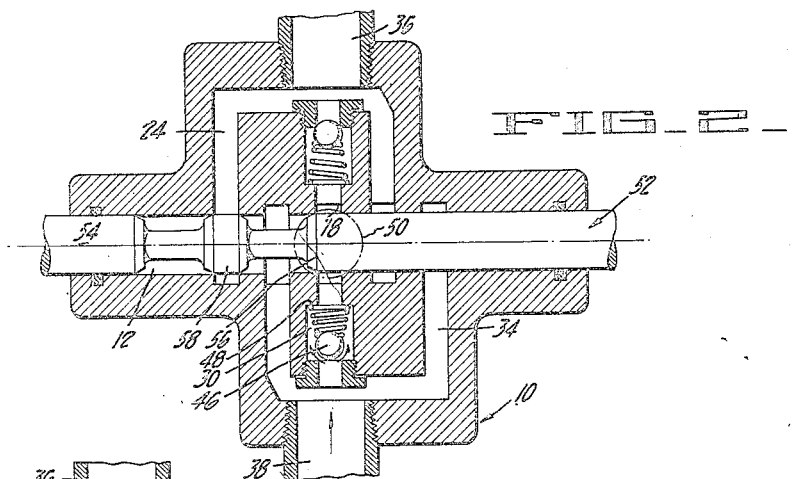
FIG_2_
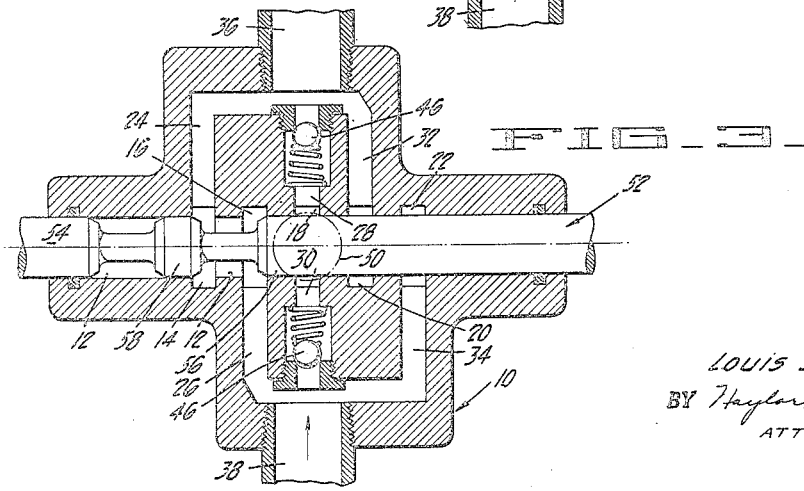
FIG_3_
INVENTOR.
Louis S. Wood
BY Taylor and Lassagne
ATTORNEYS

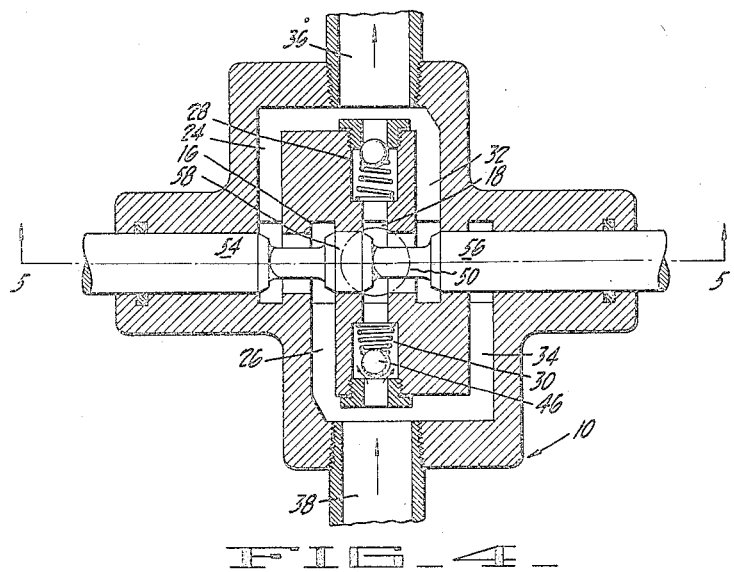
FIG_4_
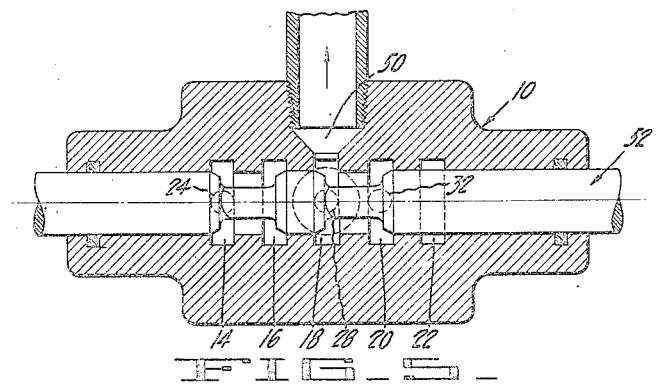
FIG_5_
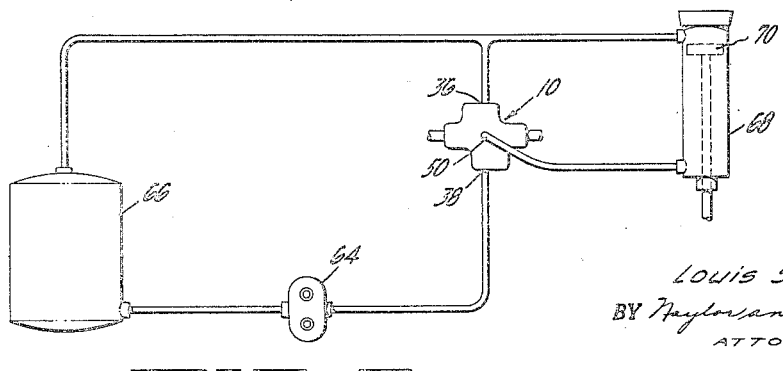
FIG_6_
INVENTOR.
Louis S. Wood
BY Naylor and Lassagne
ATTORNEYS Patented Jan. 23, 1951

UNITED STATES PATENT OFFICE 2,538,928

HYDRAULIC VALVE

Louis S. Wood, Burlingame, Calif.

Application March 15, 1947, Serial No. 734,948

6 Claims. (Cl. 277—54)

This invention relates to hydraulic valves, and more particularly to a valve for controlling the flow of pressurized fluid from a pump, or the like, to a device adapted to receive the pressurized fluid and be operated thereby.

An object of the invention is to provide a hydraulic valve of the multi-landed piston type adapted to be interposed between a source of pressurized fluid and a mechanism to be selectively operated thereby, said valve embodying means to relieve the fluid lock which would normally ensue in the valve due to particular positionings of the valve piston.

Another object of the invention is to provide a hydraulic valve of the multi-landed piston type for interposition between a pump, or other source of pressurized fluid, and a mechanism to be actuated by the fluid, said valve being so constructed that the pressure on any of the valve elements during any phase of operation of the valve may not exceed the maximum back pressure of the mechanism operated by the fluid.

A further object of the invention is to provide a simple and economical hydraulic valve structure embodying a novel and efficient relief means for preventing an inordinately high pressure buildup and consequent fluid lock during all conditions of valve operation.

Other objects and advantages of the invention will be apparent from the following description taken in conjunction with the drawings forming part of this specification, and in which:

Figure 1 is a view in section of the valve embodied in the invention, showing one position of operation of the valve;

Figures 2-4 are sectional views of the valve, similar to that of Figure 1, showing other operating positions of the valve;

Figure 5 is a view in section taken along lines 5—5 of Figure 4; and

Figure 6 is a schematic diagram showing a typical environment of use of the valve of the invention.

Referring to the drawings for more specific details of the invention, 10 indicates generally a valve casing having a longitudinal bore 12 centrally disposed therein. Equi-spaced grooves 14, 16, 18, 20 and 22, Figure 5, disposed in the wall of the bore 12 communicate, respectively, with passages 24, 26, 28, 30, 32, and 34 arranged transversely of the bore 12. Passages 24 and 32 lead through one half of the casing 10 to communicate with a low pressure outlet 36; passages 26 and 34 lead through the other half of the casing 10 to communicate with a high pressure inlet 38; while passages 28 and 30, being each double diametral to provide shoulders 40 therein and having threaded internal end portions 42, communicate, respectively, with outlet 36 and inlet 38. Ball seats 44, threadably secured to the end portions 42 of passages 28 and 30, each retain a check ball 46 within the larger diametral portions of the passages 28 and 30 against the action of a spring 48 maintained in slight compression between each ball and shoulder 40. Groove 18, with which passages 28 and 30 communicate, further communicates with a high pressure or work outlet 50 arranged in the casing 10 normal to the passages 24, 26, 28, 30, 32 and 34.

A piston, indicated at 52, is reciprocably slidable in bore 12, said piston being provided with end lands 54 and 56 and a central land 58, each of said lands having ends uniformly tapered, as at 60. It will be noted that the distance between the non-tapered portions of lands 54 and 58 and between lands 56 and 58 is equal to the distance between the oppositely disposed sides of any pair of adjacent grooves 14, 16, 18, 20 and 22 and that the non-tapered portion of land 58 is of slightly greater width than the diameter of the passages 24, 26, 28, 30, 32 and 34. Fluid seals 62 are carried within the casing 10 to prevent the leakage of fluid therefrom between the piston 52 and the wall of bore 12.

For purposes of description of the operating characteristics of the hydraulic valve of the invention, and not of limitation, the valve is shown as being incorporated in a system, such as is shown in Figure 6, wherein a pump 64 is connected to the high pressure inlet 38, and the low pressure outlet 36 is connected to a sump 66, which is also connected to the pump 64. The high pressure or work outlet 50 is connected to the hydraulic cylinder 68 of a device 70, such as a load lifting platform, the pivotable dump body of a truck, or the like, wherein the platform, or its equivalent, is adapted to be hydraulically raised by the influx of pressurized fluid to the cylinder 68; maintained in its raised position for a desired period of time; and lowered to complete the cycle of operation.

To raise the platform 70, the piston 52 of the hydraulic valve is moved by the operator by means of any suitable mechanism, not shown, to the position of Figure 1, wherein the land 58 is located to the left of passage 26 to allow the pump 64 to pass fluid from the sump 66 into the inlet 38, through the passage 26 and bore 12 to the groove 18. The pressurized fluid passes from the groove 18 into the passages 28 and 30, and through the outlet 50 into the hydraulic cylinder 68 to raise the platform 70. It will be noted that the fluid passing through the passage 26 is prevented from reaching the outlet 36, since land 58 seals passage 24 from passage 26, land 56 seals the bore 12 between groove 18 and passage 32, and ball 46 in passage 28 seals said passage from said outlet 36. Since the pressure on ball 46 in passage 30 is equally distributed over the surface thereof, said ball will remain static as long as the output of the pump 64 can be accommodated wholly by passage 26. If the output of the pump should exceed the fluid-passing capacity of passage 26, ball 46 in passage 30 will rise against the slight holding force exerted by spring 48 to allow fluid to pass through passage 30 to the groove 18.

When the platform 70 has been raised a desired amount, it may be maintained in its raised position by shifting the piston 52 to the position shown in Figure 3, wherein passage 26 is connected to passage 24 along the bore 12 to allow the fluid from the pump 64 to recirculate between the sump 66, the pump 64, passages 26 and 24 and back to the sump, while land 56 seals passage 26 from groove 18, and the balls 46 in passages 28 and 30 maintain the pressurized fluid in the cylinder 68, and, hence, maintain the platform 70 in its raised position.

However, the changing of the position of the piston 52 from that shown in Figure 1 to that of Figure 3 through the intermediate position of Figure 2 is the critical phase of operation of the valve of the invention. In the intermediate position of Figure 2, lands 56 and 58 of the piston 52 have been moved to respectively seal groove 18 from communication with passage 26 and seal passage 24 from communication with passage 26. At this precise point of operation of the valve, the pressurized fluid in passage 26 has no effective outlet from said passage proper, and in the absence of passage 30 with check ball 46 therein, as is the condition with conventional valves, the immediate build-up of pressure in passage 26 and communicating portions of the valve housing, upon continued operation of the pump 64 during the transition phase of operation of Figure 2, not only is deteriorative of the valve elements but, also, to the pump 64, due to the shock of the back-pressure build-up. It is not uncommon to find that the pressure build-up in conventional valves, when the pistons thereof are in a position equivalent to the position of piston 52 in Figure 2, is sufficient to deform or break down the edges of the lands to allow passage of fluid thereby.

All of such characteristic disadvantages of conventional valves are obviated by the provision in the valve of the invention of the passage 30 containing the ball 46. Thus, as soon as the pressure in passage 26 begins to build-up, ball 46 rises against spring 48 to by-pass the incoming fluid through passage 30, groove 18, and into the hydraulic cylinder 68. As land 58 of the piston 52 is moved to the left to reach the position of Figure 3, passage 26 is connected with passage 24 along the bore 12, and the ball 46, having a greater pressure exerted thereon at its upper side than at the side adjacent the inlet 38, is forced against the valve seat 44.

When it is desired to lower the platform 70, piston 52 is moved to the right, through the intermediate position of Figure 2, to the position shown in Figure 4, wherein the land 58 is located within the bore 12 between the grooves 16 and 18, thus allowing the fluid from the pump to pass through passages 26 and 24 to return to the sump 66 if the input rate of said fluid exceeds the carrying capacity of passage 26, ball 46 in passage 30 is urged away from the seat 44 to allow simultaneously movement of the inlet fluid through passage 30, bore 12 between lands 56 and 58, and passage 32 to the sump 66. The fluid in cylinder 68, under the weight of platform 70, is forced therefrom to pass through the valve outlet 50, groove 18, bore 12, and passage 32 to the sump, thus causing a return of platform 70 to its lowered position.

It will be noted from the foregoing description of the valve that passage 28 and passage 34 are not requisite to the operation of the valve, said passages being provided in the valve housing to render the valve structure symmetrical in order to achieve a universal valve, one adapted for either right or left hand use.

While the preferred embodiment of the invention has been shown and described, it is to be understood that such illustration and description is not definitive of the scope of the invention or the environment of use thereof, and that, rather, the invention is only to be limited by the scope of the appended claims.

What I claim as new and desire to secure by Letters Patent is:

1. A hydraulic valve comprising a housing, a bore extending therethrough, a plurality of spaced annular grooves in the wall of said bore, a high pressure fluid inlet in said housing communicating with one of said grooves, a high pressure fluid work outlet in said housing communicating with a second groove adjacent said fluid inlet groove, a low pressure or bypass fluid outlet in said housing communicating with a groove adjacent said inlet groove and with a groove adjacent said second groove, a passage providing for communication between said second groove and said fluid inlet, fluid pressure balanced valve means within said passage adapted to allow pressurized fluid to flow therethrough to said work outlet from said inlet and to prevent fluid flow from said passage in the opposite direction, and piston means carried within said bore and movable with respect thereto to selectively provide for communication between pairs of adjacent grooves through said bore.

2. A hydraulic valve comprising a housing, a bore extending therethrough, at least four equi-spaced annular grooves relieving the wall of said bore, a high pressure fluid inlet in said housing communicating with one of the inwardly disposed grooves, a high pressure fluid or work outlet in said housing communicating with the other inwardly disposed groove, a low pressure or bypass fluid outlet in said housing communicating with each of said outer grooves, a passage providing for communication between said fluid inlet and said inwardly disposed groove communicating with said fluid outlet, fluid pressure-balanced valve means within said passage adapted to allow pressurized fluid to flow therethrough in one direction to said work outlet from said fluid inlet, and piston means carried within said bore and movable with respect thereto to provide for communication between pairs of adjacent grooves along said bore.

3. A hydraulic valve as set forth in claim 2 wherein a passage is also provided between said other inwardly disposed groove and said bypass fluid outlet, said passage embodying fluid pressure balanced valve means therein to prevent outward flow only from said passage to said bypass fluid outlet, and said bore is provided with another spaced groove communicating with said fluid inlet, said valve structure being thus adapted for both right and left hand use.

4. In a hydraulic valve having an inlet and work and sump outlets communicating with a bore in which there is disposed a slidable member adapted to selectively provide for communication between said inlet and one of said outlets along said bore; a passage between said inlet and said work outlet and fluid pressure balanced valve means within said passage to allow the flow of fluid from said work inlet to said outlet when communication between said inlet and said outlets along said bore is cut off by the slidable member.

5. In a hydraulic valve having an inlet and work and by-pass outlets communicating with a bore in which there is disposed a slidable member adapted to selectively provide for communication between said inlet and one of said outlets along said bore; a passage connecting said inlet and said primary outlet, and fluid pressure balanced valve means carried in said passage adapted to allow one-way fluid flow from said inlet to said primary work outlet when communication therebetween along said bore is cut off by the slidable member.

6. A hydraulic valve comprising a housing, a cylindrical bore therethrough, at least four equally dimensioned equi-spaced annular grooves in the wall of said bore, a fluid inlet communicating with one of the centrally disposed grooves, a primary fluid or work outlet communicating with the next adjacent centrally disposed groove, a secondary fluid or sump outlet communicating with a groove adjacent said first mentioned groove and with a groove adjacent said second mentioned groove, a multi-landed piston reciprocably slidable in said bore, the distance between adjacent lands being substantially equal to the distance between the outer sides of a pair of adjacent grooves so that communication is provided between the fluid inlet and either of the fluid outlets for predetermined positions of operation of the piston, and between the two fluid outlets for another predetermined position of operation of the piston, and a passage between said inlet and the groove communicating with the primary fluid or work outlet embodying fluid pressure-balanced valve means adapted to provide for one way fluid travel therebetween from said inlet to outlet when the piston is moved to cut off communication along the bore between the fluid inlet and the fluid outlets.

LOUIS S. WOOD.

REFERENCES CITED

The following references are of record in the file of this patent:

UNITED STATES PATENTS

| Number | Name | Date |
| --- | --- | --- |
| 1,775,856 | Hauser | Sept. 16, 1930 |
| 2,295,948 | Henry | Sept. 15, 1942 |
| 2,343,689 | Mercer | Mar. 7, 1944 |
| 2,362,944 | Stephens | Nov. 14, 1944 |